Sept. 22, 1959   F. H. VAN WINSEN   2,905,460
LEAF SPRING SUSPENSION FOR VEHICLES
Filed Jan. 10, 1956

Inventor
FRIEDRICH H. VAN WINSEN
BY   Dicke and Haig.
ATTORNEYS.

United States Patent Office 2,905,460
Patented Sept. 22, 1959

2,905,460
LEAF SPRING SUSPENSION FOR VEHICLES

Friedrich H. Van Winsen, Krichheim-Teck, Germany, assignor to Daimler-Benz Aktiengesellschaft, Stuttgart-Unterturkheim, Germany Application January 10, 1956, Serial No. 558,299

Claims priority, application Germany January 17, 1955

3 Claims. (Cl. 267—54)

My invention relates to a leaf spring suspension for vehicles particularly for road vehicles, such suspension being of the type including a bushing or bushings of resilient material, such as rubber, inserted between the surrounding eye of the leaf spring and an internal bolt fixed to the chassis or vehicle body.

It is the object of my invention to simplify the structure and the assembly and disassembly of the leaf spring suspension of such type and to provide for a compact structure thereof, requiring a minimum of steel and rubber.

Further objects of my invention will appear from a detailed description of a preferred embodiment of the invention following hereinafter with reference to the drawings, it being understood that the terminology used in such description has been chosen for the purpose of illustrating the invention rather than that of limiting or restricting the same. The features of novelty for which patent protection is sought are pointed out in the appended claims.

Figure 1:
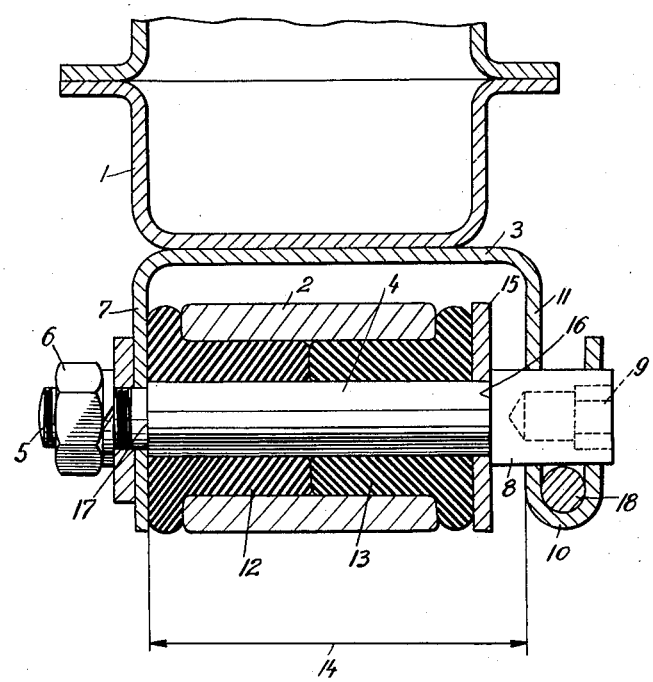
Figure 2:
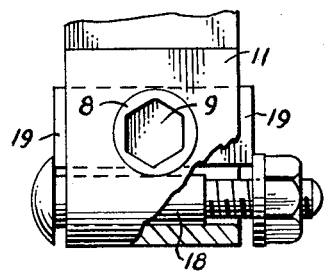

In the drawing Fig. 1 is a vertical section taken through the novel leaf spring suspension as shown, while Fig. 2 is a partial side view.

To the bottom face of a side member 1 of the chassis frame of a motor vehicle there is rigidly attached by welding or otherwise a suitable bracket in form of a yoke member 3 having a pair of arms 7 and 11 extending downwardly in spaced relationship at a distance indicated at 14, the arms 7 and 11 of the yoke member 3, being provided with registering apertures preferably of different size. A bolt 4 extends through the apertures provided in the arms 7 and 11 of the yoke member 3 and has a pair of shoulders 16 and 17 which are spaced a distance less than the distance 14. While the shoulder 17 abuts the arm 7 of the yoke member 3, a washer 15 is mounted in contact with the other shoulder 16. Bushings 12 and 13 of resilient material surround the bolt 4. They are compressed between the washer 15 and the arm 7 abutting the shoulder 17. The leaf spring to be suspended is formed with an eye 2 in the conventional manner, such eve being mounted on the bushings 12 and 13, surrounding the same. The bushings are provided with end flanges, keeping the eye 2 spaced from the arm 7 and the washer 15.

Preferably both of the shoulders 16 and 17 are facing in the same direction being provided between sections of the bolt of progressively increasing diameter. The section 5 of smallest diameter is accommodated by the smaller aperture of yoke member 3 and is preferably threaded for engagement by a nut 6 which when tightened pulls shoulder 17 into firm contact with the arm 7 of the yoke member 3, thus axially compressing the rubber bushings 12 and 13. The end section 8 of the bolt of largest diameter extends through the aperture provided in arm 11 and is preferably formed with a hexagonal hole 9. A wrench may be inserted in such hole 9 and may be used to prevent rotation of bolt 4 during the tightening of nut 6.

In order to take up any play or clearance of bolt section 8 in the arm 11, a suitable clamping device may be provided which in the embodiment shown comprises the following structure:

The end of arm 11 is bent upwardly and provided with an aperture, registering with that of arm 11 and being of the same diameter to accommodate section 8 of the bolt extending therethrough. A threaded bolt 18 extending transversely to bolt 4 is placed into the U-shaped arm 11 beneath the bolt section 8 and supports clamping blocks 19 which engage the section 8 from opposite sides and may be clamped together and against section 8 by a suitable nut screwed upon the threaded bolt 18.

The distance between the shoulders 16 and 17 is so much shorter than the internal width 14 of the yoke member 3 and the latter can readily take up the bushings 12 and 13 and the washer 15 in relaxed condition for subsequent axial compression by rotation of the nut 6. For the purpose of assembling the leaf spring suspension the bushings 12 and 13 are first inserted in the eye 2 and thereupon the leaf spring eye 2 and the washer 15 are slipped into the yoke member 3 between the arms 7 and 11 thereof. Then the bolt 14 is introduced from the right hand side with reference to the drawing until the end of the threaded section 5 projects out of the arm 7, whereupon a washer and the nut 6 are placed on the section 5. By tightening the nut 6 the rubber bushings 12 and 13 are compressed until the shoulder 17 engages the arm 7, while the bolt 4 is held against rotation by a wrench inserted in the hole 9. Finally the clamping mechanism including the threaded bolt 18 is tightened to firmly secure bolt section 8 in the arm 11 of the yoke member 3.

What I claim is:

1. Leaf spring suspension for vehicles, comprising a yoke member adapted to be fixed to a vehicle chassis frame and having a pair of arms extending downwardly in spaced relationship and being provided with registering apertures, a bolt extending through said apertures having a pair of shoulders spaced a distance less than the distance between said arms, one shoulder abutting one of said arms, a washer mounted on said bolt in contact with the other one of said shoulders, bushings of a resilient material surrounding said bolt and being compressed between said washer and said arm abutting said one shoulder, and a leaf spring formed with an eye mounted on said bushings, said washer being disposed between said eye and the other one of said arms and spaced from the latter.

2. Leaf spring suspension as claimed in claim 1 in which said shoulders are facing in the same direction being provided between sections of progressively increasing diameter of said bolt, said apertures being of different size, the smaller aperture accommodating the end section of said bolt of smallest diameter and the larger aperture accommodating the end section of said bolt of largest diameter.

3. Leaf spring suspension as claimed in claim 2 in which said end section of said bolt of smallest diameter is threaded, while said end section of said bolt of largest diameter is provided with a hexagonal hole adapted to accommodate a wrench.

References Cited in the file of this patent

UNITED STATES PATENTS

| | | |
|---|---|---|
| 2,316,439 | Leighton | Apr. 13, 1943 |
| 2,428,950 | Weiss | Oct. 14, 1947 |
| 2,585,577 | Nielsen | Feb. 12, 1952 |